March 17, 1931.      H. L. SHULDENER      1,796,407
LIQUID TREATING METHOD AND APPARATUS
Filed May 31, 1929
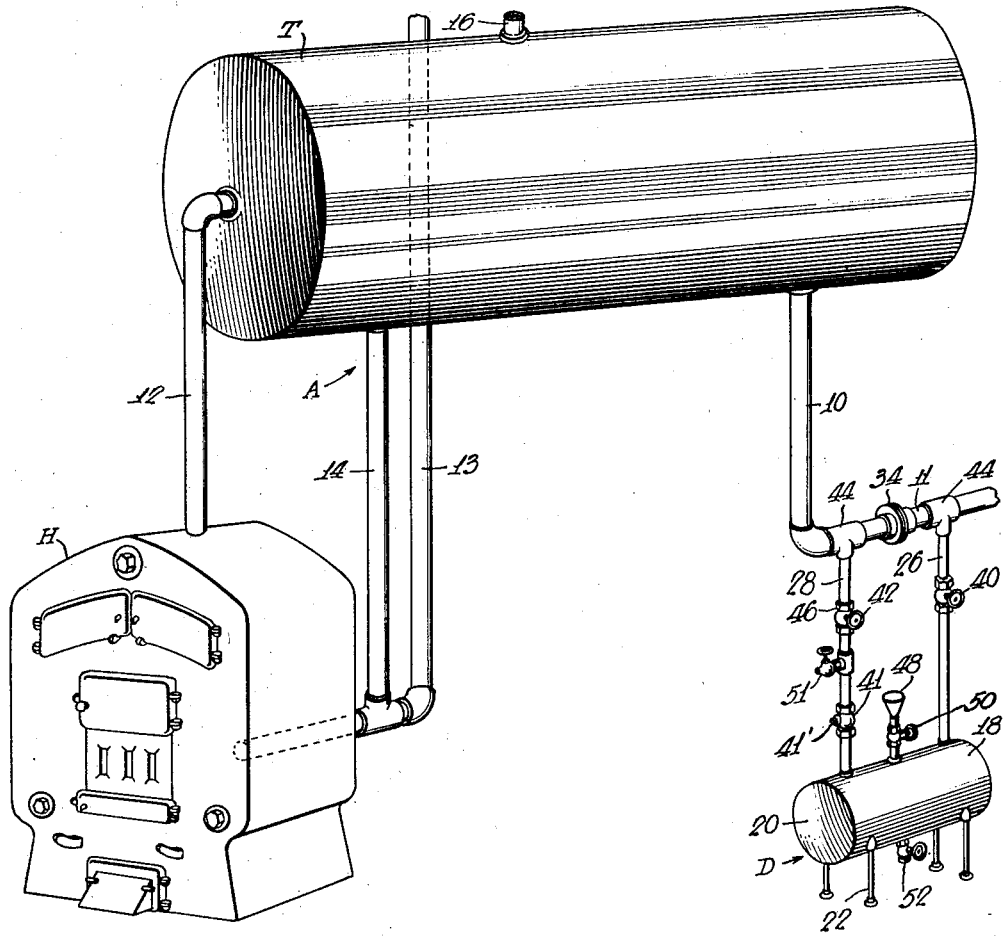
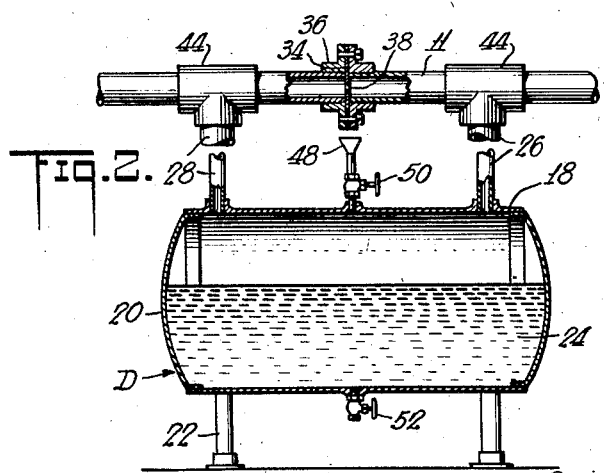
INVENTOR
Henry L. Shuldener
BY
ATTORNEYS Patented Mar. 17, 1931

1,796,407

UNITED STATES PATENT OFFICE

HENRY L. SHULDENER, OF NEW YORK, N. Y.

LIQUID-TREATING METHOD AND APPARATUS

Application filed May 31, 1929. Serial No. 367,239.

My present invention has a preferred application in the treatment of water for neutralizing the corrosive effect thereof upon iron pipes, especially in hot water systems for apartment houses, hotels and laundries.

It is an object of the invention to provide a water treating method that may be carried out automatically to apply substantially the correct quantity of treating agent for the desired purpose, without deficiency or excess under any of various flow rates, temperatures or other variables.

Another object is to provide an apparatus of the utmost simplicity for performing the above method, which shall be devoid of operating or moving mechanical parts which shall require no manual actuation to set it into or out of operation and which shall function with uniform dependability regardless whether the residue of treating substance is high or low.

Another object is to provide apparatus of the above type small in bulk yet serving for relatively long periods between chargings.

Another object is to provide apparatus of the above type which may be built into original water supply systems or applied with facility to any of various types of such systems already in use, and which may be readily set or adjusted to meet the peculiar requirements of operation existing in the particular system.

A feature of the invention is to provide a diffusion zone of water adjacent a volume of preferably concentrated treating substance. In a specific embodiment, water from the feed pipe is passed through the diffusion zone above the level of the treating substance which is preferably viscous and heavier than water.

In a preferred embodiment the water is delivered through a pair of shunt paths one of which is through the diffusion zone mentioned, and the other about the diffusion zone. Preferably means are provided to adjust the relative resistance of flow through the two shunted paths in accordance with the particular requirements of the water being treated.

In a specific application the container is of relatively large horizontal cross-section, and is only partly filled with the viscous treating substance. The container is completely closed except for the water inlet pipe feeding thereinto at one end thereof and the water outlet pipe feeding therefrom at the opposite end thereof. Both the inlet and the outlet pipes are connected to the upper part of the container, whereby water fills the container above the treating substance at all times and forms the diffusion zone therefor. In the course of water feed, water with treating substance diffused therein is entrained from the container. The mass of treating substance is however left at the bottom of the container.

In the accompanying drawings in which are shown one or more of various possible embodiments of the several features of the invention, Fig. 1 is a view in perspective illustrating a water heating supply system in which the invention has been embodied, Fig. 2 is a view in vertical longitudinal section of the water treating installation.

The conventional hot water installation shown in the drawings includes a heater H and a storage tank T, the latter supplied from the city mains or other source of cold water supply through a pipe 10. Heater H communicates with storage tank T through circulating pipes 12 and 14. Pipe 16 from the top of tank T leads to the faucets or other outlets (not shown). The circulating system shown includes a return pipe 13 draining from the distributing system back to the heater H.

In the specific embodiment of the invention shown in the drawings, there is provided a horizontal barrel shaped metal container 18 preferably with convex end walls 20 and resting upon stanchions 22 on the floor below the inlet pipe 10 to the reservoir T. The container is partly filled preferably about half way, with a water treating substance 24 heavier than water. Except for an inlet pipe 26 leading from the supply pipe 10 into the upper part thereof at one end and an outlet pipe 28 leading preferably from the upper part of the container and from the opposite end thereof back to the supply pipe 10 the container 18 is completely closed.

The supply pipe 10 preferably has a section 11 shunted across the inlet pipe 26 and the outlet pipe 28, so that said section 11 and the upper part of the container 18, afford shunted paths of flow for the water from the city mains or other source that replenishes the reservoir T as water is withdrawn therefrom for use.

Preferably the pipe 11 has a transverse plate 34 apertured at 38 and affixed between coupling flanges 36. Preferably one of the pipes 26, 28 illustratively the latter, is provided with a control valve or cock 41 which may be set in accordance with requirements by means of a suitable wrench. In practice, the inlet pipe 26 is also provided with an ordinary hand controlled valve 40 and outlet pipe 28 with a similar valve 42. The pipes 26 and 28, the control cock 41 and the valves 40 and 42 are preferably applied to the system by resort to usual plumbing practice with T fittings such as at 44 and unions (not shown). The container 18 is preferably provided with an inlet funnel 48 at the upper end thereof controlled by a valve 50 and there is a drain cock 52 in the bottom and a venting or air cock 51 illustratively in pipe 28.

The container 18 may be charged with any of a variety of substances in themselves familiar to those skilled in the art, to counteract any particular quality of the water, or to impart to the water any particular quality desired.

For preventing rusting of iron pipe systems due to the presence of iron-corrosive agencies in the water, there may be used a silicate of soda solution comprising approximately 29% of silica ($SiO_2$), 9% of sodium oxide ($Na_2O$) and 72% of water. There may also be added soda ash ($Na_2CO_3$) calculated to neutralize any free carbon dioxide in the water. Sodium hydroxide may also be used to reduce the amount of silicate required. The composition just described is heavier than water, viscous and enters into diffusion with water. There may also be added various soluble salts of calcium or magnesium which further contribute to the desired result.

To place the installed system into service, valves 40 and 42 and drain cock 52 are closed. Control cock 41, filling valve 50 and air cock 51 are opened. The treating substance is now poured in through the funnel 48 and open valve 50 until the container is preferably half filled as shown, the open air cock 51 preventing air binding. Valve 50 will now be closed. Valve 40 is next opened and water from pipe 10 will thereupon displace the air from the container above the treating substance therein. When water is seen to escape from air cock 51, the entire volume of container 18 and of the connecting piping is known to be completely filled with liquid, all air having escaped through air cock 51. This cock will now be closed and when valve 46 is opened, the system is ready for use subject only to adjustment as hereinafter described.

Treating substance 24 from the lower half of container 18 will now diffuse into the body of water filling the upper half thereof. As water is drawn for use from the system, the pressure on the water mains causes refilling of the tank by flow from the inlet pipe 10. This water is caused to divide in accordance with the resistances imposed by resistance plate 34 on the one hand, and on the other hand by the resistance imposed by the control cock 41 in the shunt passage. That portion of the water that flows through the container 18 thus entrains some of the diffused treating material and carries it on into the reservoir and from there through the heater, tank and various pipes leading to the faucets or other outlets.

It will readily be understood that if the rate of consumption of water is rapid the compensating flow through the diffusion zone will be correspondingly rapid and will correspondingly entrain more of the treating substance diffused from its surface. Regardless of the rate of water consumption, there will be carried along with the water through pipe 10 only sufficient of the treating substance to neutralize the water in its corrosive effect upon the iron surfaces. The diffusion is so fine, that the treating substance will not settle down but will be carried along uniformly mixed with the water throughout the system.

It will be understood that the greater the resistance to flow imposed by the control cock 41 the smaller the proportion of water flowing through container 18 to the treating substance. The control cock 41 is accurately set in accordance with the exact proportion of treating substance required to neutralize the particular water used. This setting of course may be determined by a preliminary analysis of the water and final adjustment after analysis of water treated with an initial more or less estimated adjustment of control cock. Preferably the control cock head 41' has a particular marking (not shown) to determine the setting and may be locked to guard against tampering.

The treating substance being heavier than water, which flows only over the top thereof, is not entrained except by extremely slow diffusion. Thus the efficacy of the residue of treating substance in the container is not impaired on the one hand by dilution nor is the treated water rendered noxious on the other by carrying along a great excess of the treating agent. By the present system the treating substance fed may be as low as 10 parts per million parts of water.

With a compact container 18 of but 10 gallons capacity and partially filled with 5 gallons of concentrated solution, a large apartment house may be guarded against rusting of pipes or tanks for a period of a week or more. The manner of servicing is obvious, but it may be briefly noted that it consists in shutting off cocks 40 and 42 opening cock 50 for venting and draining the residue of solution and water through drain cock 52. Thereupon the container is refilled in the manner above described for the original charging.

Obviously I may employ an adjustable control cock like that at 41 in lieu of the invariant perforated plate 34, but the arrangement shown is preferred as the desired rate of delivery may be thus obtained by effecting but a single adjustment. Obviously also an invariant apertured plate as at 34 may be employed in the pipe 26 or 28 in lieu of the control cock 41, such cock being in that case provided in the container shunting section 11.

While the system has a preferred application to the treatment of hot water systems, including the heater, tank and piping which are of course most subject to corrosion, it will be understood that the system is also applicable to cold water pipes especially as the treating substance used in the minute proportions noted is entirely tasteless, colorless, odorless and otherwise harmless.

The invention in certain aspects is also useful for neutralizing the water against actions other than rusting of iron pipes or for applying water softening, water hardening, coloring or flavoring substances thereto in small quantities as desired.

The invention in its broadest aspect is also applicable industrially to the treatment of fluids other than water.

It will thus be seen that there are herein described a method and apparatus in which the several features of this invention are embodied, and which in action attain the various objects of the invention and are well suited to meet the requirements of practical use.

As many changes could be made in the above method and construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In a liquid treating installation, the combination of a container partly charged with a treating fluid heavier than the liquid to be treated, means terminating adjacent the upper wall of the container admitting liquid from the source into the upper part of said container at one region thereof, and means terminating adjacent the upper wall of the container for delivering liquid from the upper part of said container at another region thereof whereby the liquid flow occurs without passing directly through undissolved treating fluid.

2. In a liquid feed installation, the combination of a container partly charged with a treating fluid heavier than the liquid to be treated, means terminating adjacent the upper wall of the container admitting liquid from the source to said container at one end thereof, means terminating adjacent the upper wall of the container for delivering liquid from the opposite end of the container near the upper part thereof to the place of consumption, both said admitting and said delivery means having clearance above the surface of the treating liquid, a conduit in shunt with the passageway through said container, and means controlling the proportion of the liquid passing through the container whereby the liquid flow occurs without passing directly through undissolved treating fluid.

3. In a water piping installation, means for automatically treating the water, said means comprising a container of relatively large horizontal cross section having a viscous treating substance therein heavier than water and means for conveying a portion of the water from the pipe system into and out of the container said means comprising inlet and outlet pipes terminating adjacent the upper wall of the container and being free from contact with the treating substance and having clearance with respect thereto, whereby the water flow occurs without passing directly through the viscous treating substance.

4. In a water piping installation, means for treating the water automatically and continuously in the course of flow, said means comprising a container having a heavy treating substance therein, a tap from the water supply pipe, communicating with the upper patr of said container, maintaining the latter filled with water above the level of the treating substance, and a return pipe from the upper part of the container to the supply pipe, said tap and said return pipe terminating adjacent the upper wall of the container and being free from contact with the treating substance whereby the water flow occurs without passing directly through undissolved treating substance.

5. In a water pipe installation, a closed container having a heavy water treating substance in the bottom thereof, an inlet pipe leading into the upper part thereof for feeding water thereinto and an outlet pipe leading from the upper part thereof for feeding water therefrom, said first pipe connected from the source of water supply, said second pipe feeding toward the region of water consumption both said pipes terminating adjacent the upper wall of the container and having clearance with respect to the treating substance whereby the water flow occurs without passing directly through undissolved treating substance.

6. In a water pipe installation, a closed container having a heavy water treating substance in the bottom thereof, an inlet pipe terminating near the upper wall of the container and delivering into the upper part thereof for feeding water thereinto and an outlet pipe terminating near the upper wall of the container and delivering from the upper part thereof for feeding water therefrom, said inlet pipe delivering from the source of water supply, said outlet pipe feeding toward the region of water consumption, and pipe means connecting said inlet to said outlet pipe to provide a passageway for water in shunt with that through said container whereby the water flow occurs without passing directly through undissolved treating substance.

7. In a water pipe installation, a closed container having a heavy water treating substance in the bottom thereof, an inlet pipe delivering into the upper part thereof and an outlet pipe delivering from the upper part thereof, said inlet pipe delivering from the source of water supply, said outlet pipe feeding toward the region of water consumption, pipe means connecting said inlet to said outlet pipe to provide a passageway for water in shunt with that through said container, and flow resistance means in said shunt passageways to govern the division of water through the container and about the container said inlet and said outlet pipes both terminating adjacent the upper wall of the container.

8. In a water pipe installation, a closed container having a heavy water treating substance in the bottom thereof, an inlet pipe delivering into the upper part thereof, an outlet pipe delivering from the upper part thereof, said inlet pipe connected from the source of water supply, said outlet pipe delivering to the region of water consumption, pipe means connecting said inlet to said outlet pipe to provide a passageway for water in shunt with that through said container, flow resistance means in said shunt passageways to govern the division of water through the container and about the container, said means including a manually adjustable element to regulate the proportion of water flow through the container said inlet and said outlet pipes both terminating adjacent the upper wall of the container.

9. In a water pipe installation a closed container having a heavy water treating substance in the bottom thereof, an inlet pipe delivering into the upper part thereof, an outlet pipe delivering from the upper part thereof, said inlet pipe connected from the source of water supply, said outlet pipe delivering to the region of water consumption, pipe means connecting said inlet to said outlet pipe to provide a passageway for water in shunt with that through said container, flow resistance means in said shunt passageways to govern the division of water through the container and about the container, said means including a manually adjustable element in one of said inlet and said outlet pipes, said container shunting pipe having a fixed flow resistance said inlet and said outlet pipes both terminating adjacent the upper wall of the container.

10. In a water pipe installation, a closed container having a heavy viscous water treating substance disposed at the bottom of said container, an inlet pipe delivering into the upper part thereof, an outlet pipe delivering from the upper part thereof, said inlet pipe connected from the source of water supply, said outlet pipe delivering to the region of water consumption, pipe means connecting said inlet to said outlet pipe to afford a passageway for water in shunt with that through said container, flow resistance means in said shunt passageways accurately to govern the division of water through the container and about the container, said container shunt pipe having a restriction member therein of invariant flow resistance, and manually adjustable resistance means in the path of water flow through the container said inlet and said outlet pipes both terminating adjacent the upper wall of the container.

11. In a hot water installation of the type comprising a heater, a storage reservoir, piping connected to the place of consumption and an inlet pipe replenishing the reservoir; the combination therewith of a treating installation comprising a container having therein a water treating substance heavier than water, and means feeding a portion of the water as it flows to said installation, through said container into diffusion contact with the surface of said treating substance, said means comprising an inlet pipe and an outlet pipe, both terminating adjacent the upper wall of said container, said means being wholly free from contact with the treating substance, whereby the water flow occurs without passing directly through undissolved treating substance.

12. A treating installation for a water supply system including a closed container having an inlet pipe extending into the upper part and at one end thereof, an outlet pipe extending from the upper part and at the other end thereof, both said inlet pipe and said outlet pipe terminating adjacent the upper wall of said container, a filling cock in the upper part thereof, a drain cock in the bottom thereof, a pair of valves in the respective pipes, an air cock in one of said pipes between said valve and said container and a control cock in said pipe between said air cock and said container.

Signed at New York in the county of Bronx and State of New York this 27th day of May, A. D. 1929.

HENRY L. SHULDENER.